May 15, 1945.  C. R. JEFFREYS  2,376,058
PIPE COUPLING
Filed July 9, 1943

INVENTOR:
CHARLES R. JEFFREYS,
BY: John E. Jackson
ATTORNEY.

Patented May 15, 1945

2,376,058

UNITED STATES PATENT OFFICE 2,376,058

PIPE COUPLING

Charles R. Jeffreys, McKeesport, Pa.

Original application December 9, 1942, Serial No. 468,401. Divided and this application July 9, 1943, Serial No. 494,090

3 Claims. (Cl. 285—145)

This invention relates to pipe couplings for fastening lengths of pipe together. When these coupled lengths of pipe are used as structural members or as extensions for manipulating tools from a remote position, it is necessary to reinforce the joints to obtain the required rigidity. The coupling is utilized in the extension shown in my copending application, Serial No. 468,401, filed December 9, 1942, of which this application is a division.

It is an object of this invention to provide a coupling which is reinforced to obtain a rigid connection.

This and other objects will be more apparent after referring to the following specification and attached drawing, in which.

Figure 1:
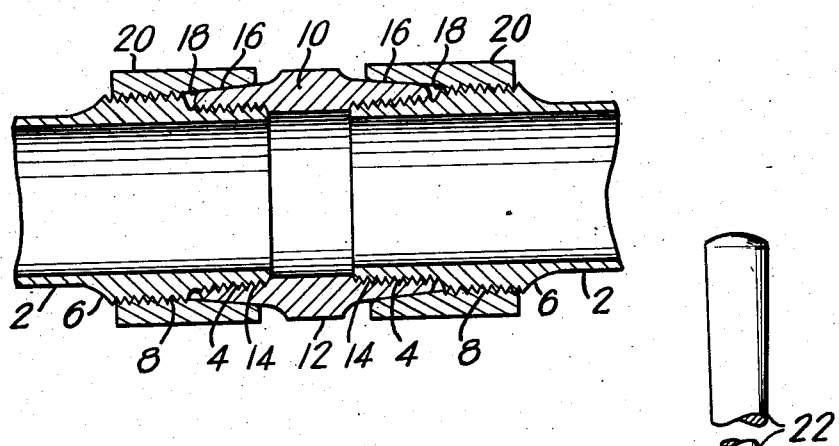
Figure 1 is a cross sectional view of the coupling.

Referring more particularly to the drawing, the reference numeral 2 indicates pipes which are to be coupled together, each pipe having a pipe thread 4 on the end thereof. Adjacent the pipe thread, the pipe has a raised portion 6 having a straight thread 8 thereon. A sleeve 10 having a hexhead 12 has pipe threads 14 on each end for receiving the threads 4 of pipes 2. The sleeve 10 has a tapered portion 16 on each end for cooperation with a corresponding tapered portion 18 on a nut 20. After the sleeve 10 has been connected to the two sections of pipe 2, the reinforcing nuts 20 are threaded on the threads 8, the tapered portions 16 and 18 engaging to obtain a rigid reinforced connection.

Figure 2:
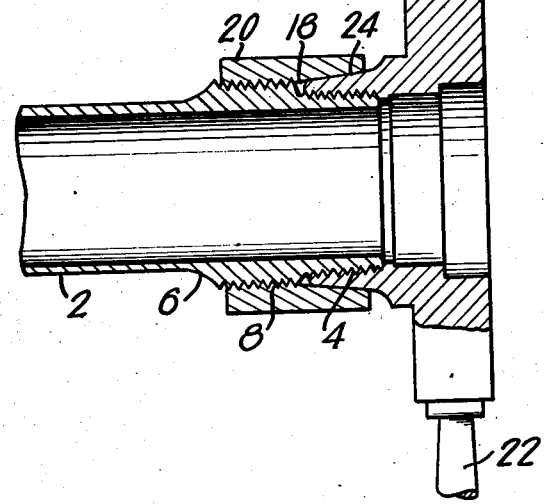
Figure 2 is a cross sectional view showing a handle fastened to a pipe by means of the coupling of the present invention.

Figure 2 shows how a handle may be attached to an end of the pipe by means of the reinforced connection. A handle 22, having a tapered portion 24 similar to that of the tapered portion 18 of the sleeve 10, is threaded on the threads 4 at the end of pipe 2. The nut 20 is then threaded on the threads 8 and the connection is reinforced by means of the wedging action of the tapered sections 18 and 24.

While two adaptations of the invention have been described, it will be seen that other modifications and adaptations may be made without departing from the scope of the attached claims.

I claim:

1. A coupling for connecting pipe sections, the ends of each section having a standard pipe thread thereon and a straight thread on a raised portion adjacent said pipe thread, comprising a sleeve having threads for receiving said pipe threads and a tapered exterior portion on each end thereof, and a nut threaded on each of said straight threads, each of said nuts having an internally tapered portion for cooperating with the tapered portion of said sleeve.

2. A coupling for connecting the ends of cylindrical members, each member having a thread on the end thereof and a thread of greater diameter adjacent said first named thread, comprising a sleeve having a tapered exterior portion on each end thereof, said sleeve being threaded to receive the first named threads, and a nut threaded on each of said second named threads, each of said nuts having an internally tapered portion for cooperating with the tapered portion of said sleeve.

3. A reinforced connection comprising a cylindrical member having a thread on one end thereof, a raised portion on said member adjacent the thread, a thread on the raised portion adjacent the first thread, a sleeve having a tapered exterior portion, said sleeve being threaded to receive said first thread, and a reinforcing nut threaded on said second thread, said nut having an internally tapered portion for cooperating with the tapered portion of said sleeve.

CHARLES R. JEFFREYS.